United States Patent
Polidor et al.

(10) Patent No.: US 6,518,996 B1
(45) Date of Patent: Feb. 11, 2003

(54) COMPACT VIDEO INSPECTION APPARATUS WITH Y, Z, X COMPOUNDED MEASUREMENT AXES

(75) Inventors: Edward T. Polidor, Webster, NY (US); Albert G. Choate, Rush, NY (US)

(73) Assignee: Optical Gaging Products, Inc., Rochester, NY (US)

( * ) Notice: Subject to any disclaimer, the term of this patent is extended or adjusted under 35 U.S.C. 154(b) by 0 days.

(21) Appl. No.: 09/256,343

(22) Filed: Feb. 22, 1999

(51) Int. Cl.⁷ ................................................ H04N 7/18
(52) U.S. Cl. ........................................ 348/95; 382/151
(58) Field of Search ............................ 348/92, 94–95, 348/86–87, 125–126; 382/141, 144–145, 147, 149, 151

(56) References Cited

U.S. PATENT DOCUMENTS

| | | | | |
|---|---|---|---|---|
| 4,866,629 A | * | 9/1989 | Chen et al. .................. 700/95 |
| 4,953,016 A | * | 8/1990 | Boujon et al. ................ 348/94 |
| 4,972,311 A | * | 11/1990 | Holdgrafer et al. .......... 700/60 |
| RE33,774 E | * | 12/1991 | Gurny ........................ 33/503 |
| 5,184,217 A | * | 2/1993 | Doering ...................... 348/88 |
| 5,307,420 A | * | 4/1994 | Fujino et al. ............... 382/152 |
| 5,396,279 A | * | 3/1995 | Vossen ....................... 348/95 |
| 5,505,777 A | * | 4/1996 | Ciardella et al. ........... 118/663 |
| 5,621,530 A | * | 4/1997 | Marrable, Jr. .............. 356/394 |
| 5,657,075 A | * | 8/1997 | Roessner .................... 348/126 |
| 5,801,764 A | * | 9/1998 | Koizumi et al. ............ 348/125 |
| 5,963,314 A | * | 10/1999 | Worster et al. ........... 356/237.2 |
| 5,973,471 A | * | 10/1999 | Miura et al. ................ 318/640 |
| 6,175,646 B1 | * | 1/2001 | Schemmel et al. ......... 382/149 |
| 6,435,808 B1 | * | 8/2002 | Araya et al. ................ 414/783 |

* cited by examiner

*Primary Examiner*—Vu Le
(74) *Attorney, Agent, or Firm*—Shlesinger, Fitzsimmons & Shlesinger

(57) ABSTRACT

A yoke is supported on a frame for vertical movement in a Z direction above a transparent work support that is mounted on the frame for horizontal adjustment in a Y direction, normal to the Z direction. A carriage which is mounted for horizontal adjustment on the yoke in an X direction, normal to the Y and Z directions, carries a video camera and lens system which overlies the work support to project an image of an inspected workpiece to the camera. A substage collimator which is mounted on the frame beneath the work support for adjustment in the X direction, has thereon a souce of collimated light that registers with the lens system. The collimator is connected to the carriage to be moved in unison therewith in the X direction, and always to maintain the light source in registry with the lens system.

13 Claims, 3 Drawing Sheets

COMPACT VIDEO INSPECTION APPARATUS WITH Y, Z, X COMPOUNDED MEASUREMENT AXES

BACKGROUND OF THE INVENTION

This invention relates to video inspection apparatus having an optical system carriage movable adjustably along X (horizontal) and Z (vertical) axes above a transparent object stage or work table, which is movable along a Y (horizontal) axis disposed at right angles to the X and Z axes, and beneath which table a substage collimator system is adjustable along another X axis simultaneously with the X axis adjustment of the optical system carriage.

Heretofore, typical video inspection systems of the type described have employed an object stage or work table mounted on a base for adjustment along respective X and Y axes which extend at right angles to each other, and generally beneath a downward viewing optical system carried by a slide that is mounted for vertical adjustment on a Z axis. In addition to such typical systems, systems capable of conducting substantially larger measurements are often formed as part of a gantry arrangement which supports the optical system and its vertically movable slide. Typically in such system a large bridge structure is supported on two large linear bearings which support the bridge for motion solely in a Y direction relative to a stationary object. Upon the bridge is mounted a linear slide which is adjustable on the bridge in an X direction, and which carries for vertical adjustment thereon the optical system slide. In this manner the optical system can be positioned over a desired X, Y location.

Among the advantages of the present invention over such prior art systems is the fact that the measurement range in the vertical Z direction can be extended substantially, while offering certain precision advantages. For example, having the X axis in a fixed relationship to the measurement plane of the optical system at any height Z within the measurement volume, provides better consistency and reduces the inaccuracy effects of pitch, roll, and yaw of the associated linear slide mechanisms.

Accordingly, it is an object of this invention to provide an improved, compact video inspection apparatus of the type described which utilizes an object stage or work support that moves on a linear slide only in one direction (the Y direction), while the slide or carriage which is mounted for movement in the X direction, and which supports thereon the optical system, is movable vertically in the Z direction simultaneously with the entire optical system.

A further object of this invention is to provide an improved video inspection system of the type described in which the object stage or work support is mounted on a base for movement only in one direction (the Y direction), while a yoke mechanism, which is mounted for vertical movement on the base relative to the work support, has mounted thereon a slide or carriage which is movable in an X direction on the yoke, and which carries an associated optical system that is mounted for movement with the carriage in the X and Z directions relative to the work support.

Still another object of this invention is to provide an improved, compact video inspection apparatus of the type described wherein a substage collimator is mounted beneath the transparent work support or object stage for adjustment with the optical system in the X direction, thereby to maintain the collimator in registration with the optics head of the optical system.

Another advantage of this invention is that it includes an optical system carriage that is adjustable horizontally in an X direction on a yoke that in turn is adjustable vertically in a Z direction, thereby to achieve precise Z motion for the optical system.

Still a further object of this invention is to provide an inspection apparatus of the type described in which an optical system carriage, which in the X direction, is connected by a cable to a substage collimator to transmit movement of the optical system carriage to the substage collimator.

SUMMARY OF THE INVENTION

A transparent work-supporting slide is mounted on a base for adjustment horizontally thereon in a Y direction. A yoke is supported for vertical movement in a Z direction on a pair of cylindrical columns which project upwardly from the upper surface of the base. A carriage which is mounted on the face of the yoke for horizontal adjustment in an X direction carries a lens system having in its lower end an objective lens mechanism which faces the transparent work support, and which has in its upper end a video camera for receiving an image from the objective lens mechanism. A substage collimator supporting arm is mounted in the base beneath the transparent work support for horizontal adjustment in the X direction. The forward end of the arm extends beneath the transparent work support and has therein a source of collimated light, which registers with the objective lens mechanism and is disposed to illuminate the underside of a workpiece mounted on the transparent work support. A system of cables connects the optical system carriage to the substage collimator arm so that the carriage and arm are made to shift in unison in the X direction, thereby maintaining the collimated light source always in registry with the objective lens of the optical system.

THE DRAWINGS

Figure 3:
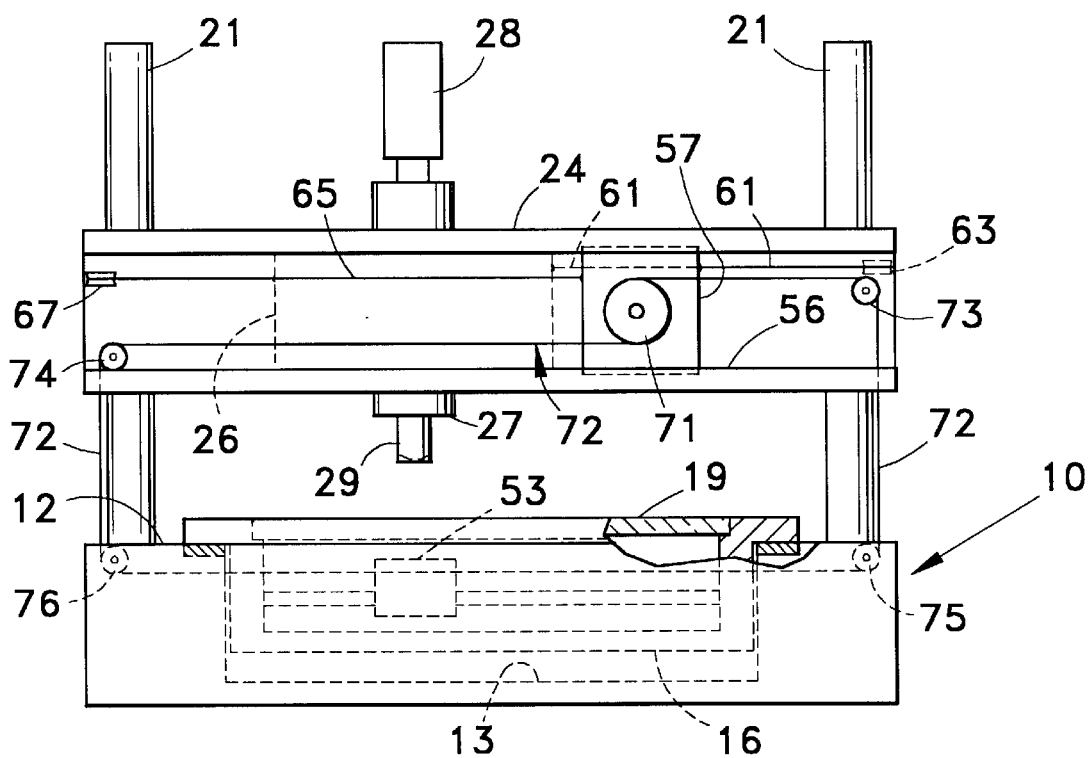
Figure 4:
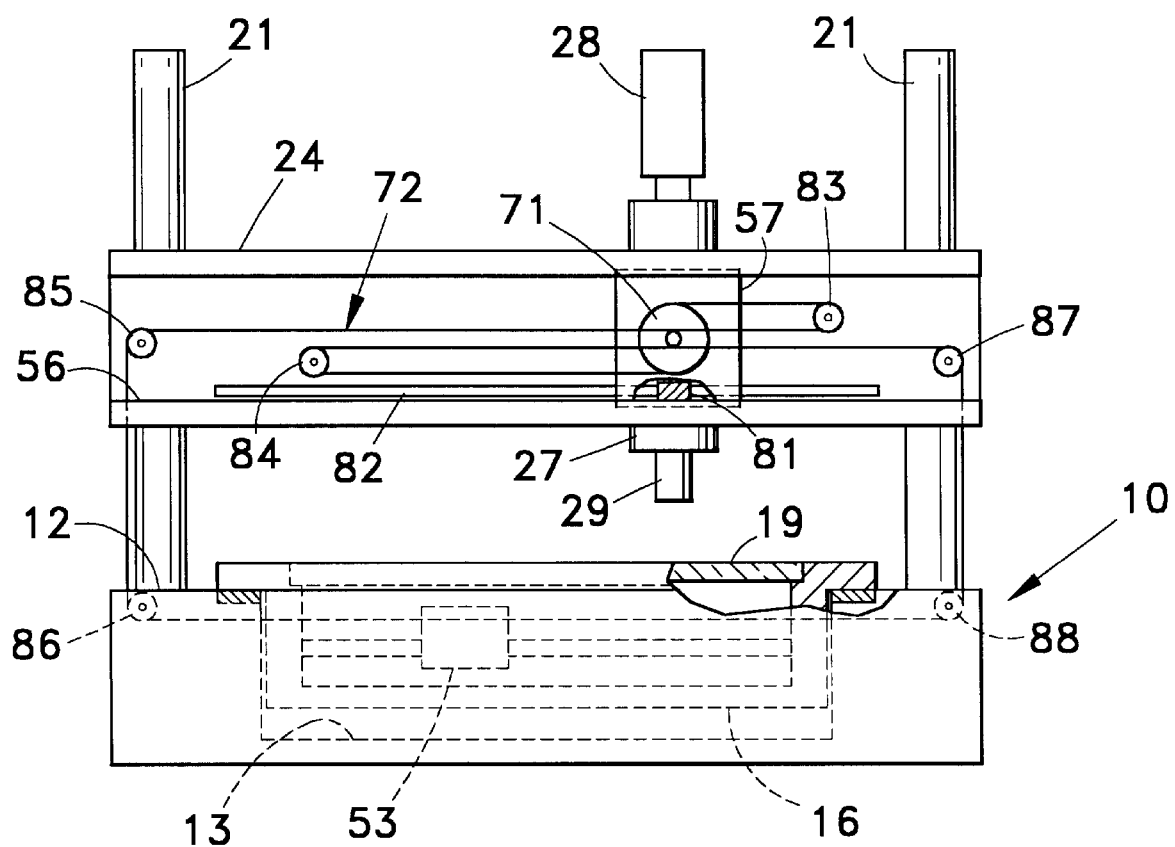

FIG. 3 is a rear elevation viw of this apparatus on a slightly smaller scale, and illustrating one manner in which the substage collimator component of the apparatus may be connected by a cabling mechanism to a counter-balancing carriage which is mounted with a lens system carriage for adjustment in the Z direction by a vertically adjustable yoke, and for adjustment in an X direction relative to the yoke.; and FIG. 4 is a rear elevational view similar to FIG. 3, but showing a modified form of the cabling mechanism shown in FIG. 3.

DETAILED DESCRIPTION OF THE PREFERRED EMBODIMENTS

Figure 1:
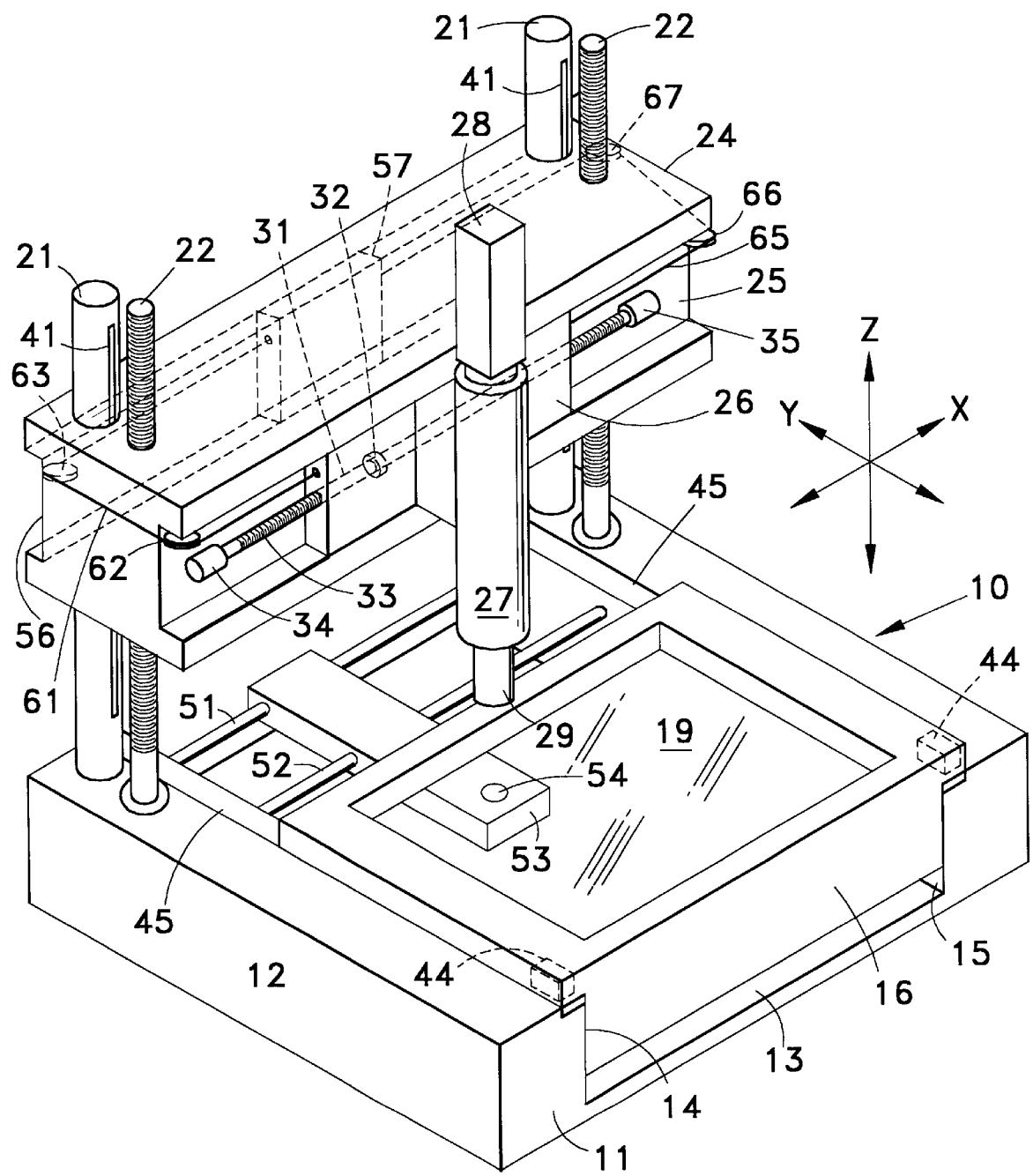
FIG. 1 is a perspective view of a compact video inspection apparatus made according to one embodiment of this invention, and illustrating schematically by the intersecting lines X, Y and Z, the respectively different directions in which the three different components of the apparatus are adjustable.
Figure 2:
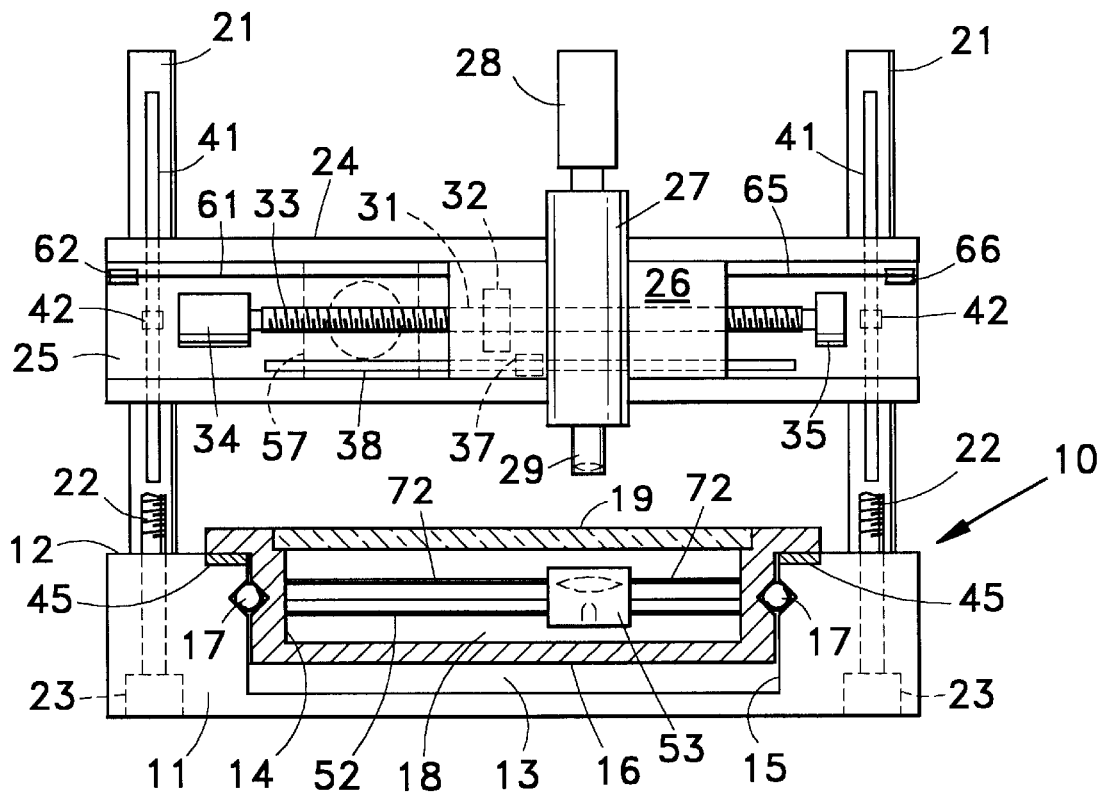
FIG. 2 is a front elevational view of this apparatus, but with a portion thereof shown in section.

Referring now to the drawings by numerals of reference, 10 denotes generally the base of compact video inspection apparatus made according to one embodiment of this invention. The base 10, which is generally rectangular in configuration has a plane front surface 11, and a plane upper surface 12 extending normal to the front surface 11. Upper surface 12 has formed centrally thereof a relatively deep, rectangularly shaped recess 13 which extends between the front and rear ends of the base 10, and which has opposed, spaced, parallel side walls 14 and 15. Mounted in recess 13 for adjustment longitudinally thereof in the direction Y, as shown in FIG. 1, is a rectangularly shaped work supporting table 16. As shown more clearly in FIG. 2, opposite sides of the table 16 are supported by two linear sets of ball bearings 17 in the confronting side walls 14 and 15 of the recess 13. Like base 10, table 16 has in the upper surface thereof a large rectangular recess 18 (FIG. 2) the upper end of which is closed by a transparent, rectangular, work supporting plate 19 that is secured around its edges in registering recesses formed in the inside surfaces of recess 18.

Secured at their lower ends in the base 10 adjacent the rear end thereof, and projecting vertically upwardly from the upper surface 12 of the base in spaced, parallel relation to each other are two cylindrical rod bearings 21. Mounted adjacent opposite ends thereof on the bearings 21 for vertical adjustment thereon by a pair of conventional drive screws 22 in the Z direction, as shown in FIG. 1, is a rigid yoke 24 which is generally rectangular in cross section. Screws 22, which are connected at their lower ends to the shafts of a pair of motors 23 (FIG. 2) that are mounted in base 10 adjacent opposite sides thereof, are drivingly connected to internally threaded bores formed in yoke 24 adjacent opposite sides thereof, Motors 23, which may be controlled by any conventional means forming no part of this invention operate in unison to shift yoke 24 selectively in opposite directions in the Z axis.

In its front face or surface, the surface facing the forward end of base 10, the yoke 24 has therein an elongate, rectangular recess 25, which extends between opposite sides of the yoke, and which has slidably mounted therein a rectangularly shaped slide or carrier 26, which is supported on yoke 24 for sliding movement relative thereto in the X direction. Secured to the face of the carrier 26 for movement therewith in the X direction is a housing 27 for a conventional optical magnification system. Mounted on the upper end of housing 27 for movement therewith is a conventional video camera 28, which is disposed to receive from the optical system images of the workpiece (not illustrated) mounted on the transparent plate 19. To this end a fitting 29 which projects from the lower end of housing 27 has therein the usual objective lens mechanism that is disposed to be placed in registry with a workpiece that is mounted on plate 19 for inspection by the optical system and for recording by the camera 28.

Carriage 26 has therethrough an elongate bore 31 which extends in the X direction between opposite ends of the carriage. Secured in a recess in carriage 26 intermediate the ends thereof is a drive nut 32 having an internally threaded bore disposed coaxially of the carriage bore 31. A carriage drive screw 33, which extends coaxially and rotatably through carriage bore 31, is drivingly threaded intermediate its end with the bore in drive nut 32. Screw 33 is connected at one end to the output shaft of a motor 34 which is secured to the bottom of the recess 25 in yoke 24 adjacent one end thereof, and is rotatably journaled at its opposite end in a bearing 35 which also is secured in recess 25 adjacent the opposite end thereof. When motor 34 is energized the screw 33 drives carriage 24 selectively in opposite directions in recess 25, and always in the X direction. Concurrent with such movement, the housing 27 and its associated video camera 28 and lens fitting 29 likewise are moved as a unit in the X direction with the carriage 26.

To determine the exact position of the carriage 26 and associated optical system housing 27 conventional location sensing devices may be employed. In the embodiment illustrated, carriage 26 has mounted in a recess therein an electrical position sensor 37, which registers with an elongate scale 38 that is mounted in the bottom of the recess 25 to extend longitudinally thereof in the X direction. In a similar manner, each vertical rod 21 and 22 has mounted thereon an elongate scale 41 which registers with one of two electrical sensors 42 that are mounted in the yoke 24 adjacent opposite ends thereof to provide precise indications of the position of yoke 24 in the Z direction relative to the work supporting chamber. And as shown in FIG. 1, flanged sections of the table 16, at opposite sides thereof slidably overlie the upper surface 12 of base 10 and carry electrical sensors 44, which register with and are slidable over the upper surfaces of elongate, linear scales 45, which are secured in the upper surface 12 of the base 10 adjacent opposite sides of the recess 13. In this manner the respective positions of the carrier 26 in the X direction, the table 26 in the Y direction, and the yoke 24 in the Z direction can be accurately determined by the signals produced by the sensors 37, 42 and 44.

Mounted in the recess 13 of base 10 for movement in the X direction beneath the work supporting plate 19 is an elongate collimator supporting arm 53. Arm 53, which is generally rectangular in cross section, is slidably supported adjacent its rear or left end as shown in FIG. 1 on a pair of spaced, parallel, cylindrical guide rods 51 and 52, which are secured at opposite ends thereof in the opposed side walls 14 and 15 of a recess 13 in the base 10. The rods 51 and 52, which extend parallel to each Other in the X direction, extend slidably intermediate their ends through a pair of registering recesses formed in arm 53 to extend parallel to each other between opposite sides of the arm. Arm 53 is thus slidable in the X direction on the rods 51 and 52, and in a plane which is spaced beneath and parallel to the transparent work supporting plate 19.

On its forward end arm 53 has in the upper surface thereof an opening 54 which, as noted hereinafter, is positioned to register with the objective lens mechanism carried by the fitting 29 on the lower end of the video camera housing 27. Mounted in arm 53 beneath the opening 54 is a conventional light source which is operable on a conventional manner to transmit collimated light upwardly through opening 54 and against the bottom of any work which happens to be mounted thereover on the transparent plate 19.

In order to maintain the light emitting end of the arm 53 in registry with the video camera housing 27 it is necessary that the video camera carrier 26 move in unison in the X direction. For this purpose the rear face of 25 has therein an elongate slot 56 in which is slidably mounted a rear Of counterbalancing carriage 57 which is slidable in the X direction between opposite ends of the yoke 24. For this purpose the carriage 26 is secured at one end thereof (the left end in FIG. 1 and the right end in FIG. 3) to One end of a cable 61, the opposite end of which cable is secured to one end (the left end in FIG. 1 and the right end in FIG. 3) of the rear carriage 57. Intermediate its ends cable 61 passes around two, spaced, circular pulleys 62 and 63 which are mounted to rotate in a common plane about spaced, vertical axes which are located adjacent the left ends of the recesses 25 and 56 in yoke 24, as shown in FIG. 1. At its opposite end, or at the right end in FIG. 1 and the left end in FIG. 3, the front carriage 26 is secured to one end of another cable 65, the opposite end of which is connected to the rear carriage 57 at the end thereof remote from the end to which the cable 61 is attached—i.e., the right end of carriage 57 as shown in FIG. 1, and the left end thereof as illustrated in FIG. 3. Intermediate its ends cable 65, like the cable 61, is guided around two, spaced pulleys 66 and 67 which are mounted on yoke 24 adjacent the right ends in FIG. 1 of the recesses 25 and 56 to rotate in a common horizontal plane.

In addition to being connected to the front carriage 26, and referring now to FIG. 3, the rear carriage 57 has rotatably mounted on the rear face thereof a spool 71 which rotates about a Y axis, and which has associated therewith, in a conventional manner, a recoil spring the purpose of which will be noted hereinafter. The spool 71 is connected to the collimator arm 53 by another cable 72 which is wound intermediate its ends around the spool 71 and extends at opposite ends thereof, and in opposite directions from diametrally opposite sides of the spool, around a pair of pulleys 73 and 74, respectively, which are mounted in the recess 56 of the yoke 24 to rotate about spaced, parallel Y axes. From the pulley 73 one end of the cable 72 extends vertically downwardly where it passes around another pulley 75, which is mounted in base 10, and then travels horizontally to a point where it is attached to one side of arm 53 between the guide rods 51 and 52. The other end of cable 72, after passing around pulley 74, passes vertically downwardly and around another pulley 76 which is mounted to rotate in the base 10 adjacent the side thereof remote from the side containing pulley 75. After passing around pulley 76 the associated end of cable 72 is attached to the side Of arm 53 opposite to and in registry with the point to which the opposite end of the cable has been attached.

As a result of the above-noted cable connections, whenever the front carriage 26 is shifted in an X direction, for example toward the right in FIG. 3, cable 61 causes the rear carriage 57 to be shifted toward the left in FIG. 3. The spool 71 is held against rotation by its associated recoil spring, so that as carriage 57 moves toward the left in FIG. 3, the section of cable 72 that passes around pulleys 73 and 75 cause arm 53 likewise to be drawn toward the right in FIG. 3, thereby maintaining the light source in arm 53 in vertical registry with the lens mechanism in fitting 29. Of course when the front carriage 26 is moved toward the left in FIG. 3, carriage 57 will move in the Opposite direction and cable 72, via pulleys 74 and 76, will move arm 53 also to move toward the left in FIG. 3.

FIG. 4, which is a rear view generally similar to FIG. 3, illustrates a modified form of the invention in which the rear carriage 57 is secured to the front carriage 26 for movement therewith in the X direction by means of a rigid bar or bracket 81. At one end bar 81 is fixed to the back of the carriage 26, and extends rearwardly therefrom through an elongate slot 82 formed in the yoke 24, and is fixed at its opposite end against the rear surface of yoke 57. As shown in FIG. 4, bracket 81 thus secures carriages 26 and 57 in registry with each other, and is slidable longitudinally in the slot 82 which extends in the X direction in the yoke 24 intermediate the ends thereof. As in the preceeding embodiment, the circular, spring-loaded spool 71 is mounted to rotate about a Y axis on the rear face of the carriage 57. Also as in the preceding embodiment, a cable 71 is wound intermediate its ends around the spool 71, and has opposite ends thereof extending in opposite directions from diametrally opposite sides of the spool.

In this embodiment opposite ends of cable 72 extend around a first pair of spaced reversing pulleys 83 and 84, which are mounted in recess 56 to rotate about Y axes spaced from opposite ends of the carriage 57. From the pulley 83 the associated end of cable 72 extends horizontally in an X direction toward the opposite end of recess 56 where is passes over another pulley 85 that is rotatably mounted in recess 56 coaxially of a Y axis. From pulley 85 the cable 72 passes vertically downwardly and around another Y-axis mounted pulley 86 which is rotatably mounted in base 10, after which the cable passes in an X direction into the recess 13 where its terminal end is secured to one side of arm 53. The other end of the cable 72, after passing around the reversing pulley 84 extends in the X direction toward the opposite end of recess 56 where it passes around another Y-axis mounted pulley 87, and then vertically downwardly to a sixth pulley 88, which is mounted in base 10 to rotate about a Y axis. From the pulley 88 the associated end of cable 72 passes in the X direction into recess 13 where it is secured to the side of arm 53 opposite to and in registry with the other end of the cable.

With this construction, when the front and rear carriages 26 and 57 move in unison towards, for example, the left in FIG. 4 the reversing pulley 84 provides slack for the associated end Of cable 72, while the reversing pulley 83 causes the associated end of cable 72 to be drawn in the same direction as the carriages 26 and 57, thereby causing the light emitting end of the arm 53 to remain in registry with the lens fitting 29. This construction eliminates the need for employing the cables 61 and 65 described in connection with the preceding embodiment. Moreover, in connection with both embodiments, whenever the yoke 24 is shifted vertically on the columns 21, the spring-loaded spool 71 permits extension of the overall operating length of the cable 72 when the yoke is elevated, and conversely, when the yoke 24 shifts downwardly on the columns 21, the recoil spring associated with spool 71 causes the spool to rotate in a direction (for example counterclockwise in FIGS. 3 and 4) to maintain proper tension in the cable 72 at all times.

From the foregoing it will be apparent that the present invention provides an extremely accurate and compact inspection apparatus which utilizes in arm 53 a substage illuminator that always remains in registry with the objective lens mechanism in the fitting 21 regardless Of the adjustment of the associated video camera 28 in the X or Z direction, and regardless also of the movement of the associated work that is being inspected on movement Of the table 16 and its transparent work support 19 in the Y direction. Moreover, the electrical position sensors 37, 42 and 44 in association with their related scales, provide instantaneous and very accurate indications of the respective positions of the components that are adjusted in the X, Z and Y directions, respectively.

While this invention has been illustrated and described in detail in connection with only certain embodiments thereof, it will be apparent that it is capable Of still further modification. For example, a conventional touch probe could be mounted on yoke 24 adjacent to, or in place of the video optical system, and for adjustment also in the X direction on the yoke. Also, of course, two separate cables could be wound on spool 71, or on two such spools, to perform the same function as cable 72. Moreover, it will be apparent also that this application is intended to cover any such modifications as may fall within the scope of one skilled in the art, or the appended claims.

What is claimed is:

1. In a video inspection apparatus having a frame, a work support table mounted on said frame for reciprocable adjustment thereon horizontally in a Y direction, and a yoke member mounted on said frame for vertical adjustment thereon above said table in a Z direction which extends normal to said Y direction, the improvement comprising an optical system carriage mounted on said yoke member for vertical adjustment therewith, and for reciprocable adjustment relative thereto in an X direction which extends at right angles to each of said Y and Z directions, and a video optical system mounted on said carriage for movement therewith in said X and Z directions, said system having adjacent one end thereof an objective lens mechanism disposed to register with a workpiece placed for inspection on said table, and having adjacent its opposite end a video camera for receiving images of a workpiece from said lens mechanism.

2. Video inspection apparatus as defined in claim 1, wherein said work support table is transparent, and a substage illuminator mechanism is mounted on said frame beneath said table and is operative to direct light upwardly through said table.

3. Video inspection apparatus as defined in claim 2, wherein said substage illuminator mechanism produces collimated light and is mounted for reciprocable adjustment in the X direction on said frame.

4. Video inspection apparatus as defined in claim 2, wherein said illuminator mechanism extends beneath said table and has thereon a light source registering with said objective lens mechanism and operable to direct collimated light in the direction of said lens mechanism, and means connects said carriage to said illuminator mechanism and is operative to cause said illuminator mechanism to move in unison with said carriage solely in said X direction, thereby to maintain said light source in registry with said lens mechanism.

5. Video inspection apparatus as defined in claim 4, wherein said means comprises, a spring-loaded spool mounted on said yoke member for reciprocation relative thereto in the X direction, and for rotation about an axis extending in the Y direction, and having a recoil spring which resists said rotation of the spool, a cable wound intermediate its ends about said spool and connected at opposite ends thereof to opposite sides respectively of said collimator mechanism, and means connecting said spool to said carriage for movement thereby in the X direction upon movement of said carriage in the X direction, said cable being operative to move said collimator mechanism in the X direction in unison with said carriage when said spool is moved in the X direction.

6. Video inspection apparatus as defined in claim 5, wherein said cable is operative to cause said spool to be rotated in response to movement of said yoke member in the Z direction.

7. Video inspection apparatus as defined in claim 2, including a further carriage mounted on said yoke member for movement therewith in the Z direction, and for movement relative thereto in the X direction, and means connecting said further carriage to said optical system carriage and operative to move said further carriage in said X direction in unison with but oppositely to the movement of said optical system carriage in said X direction.

8. Video inspection apparatus as defined in claim 1, including drive means connected to said optical system carriage and operable to move said carriage selectively in said X direction to a position of rest on said yoke member, and electrical sensing means interposed between said carriage and said yoke member and operative to indicate the exact position of said carriage on said yoke member.

9. Video inspection apparatus as defined in claim 1, including a pair of spaced, parallel rod bearings projecting upwardly in the Z direction from said frame adjacent one end thereof, said yoke member being mounted adjacent opposite ends thereof on said rod bearings for movement relative thereto in the Z direction, and electrical sensing means interposed between said rod bearings and said yoke member and operative to indicate the exact position of said yoke member in the Z direction on said rod bearings.

10. Video inspection apparatus as defined in claim 9, wherein said electrical sensing means comprises an elongate scale secured on each of said rod bearings to extend longitudinally thereof, and a pair of electrical position sensors mounted on said yoke member adjacent opposite ends thereof to register with said scales, said sensors being operative upon movement of said yoke member in the Z direction to generate electrical signals indicative of the position of the yoke member in the Z direction relative to said table and any workpiece supported thereon.

11. Video inspection apparatus as defined in claim 1, wherein said work support table is transparent, and a light source is mounted on said frame beneath said table and is operable to direct light through said table and toward said objective lens mechanism.

12. Video inspection apparatus as defined in claim 11, including drive means connected to said yore member and operable to adjust said member in the Z direction on said frame independently of the movement of said carriage in the X direction on said yoke member.

13. Video inspection apparatus as defined in claim 11, wherein said light source is mounted for movement relative to said frame in the X direction, and means connects said light source to said carriage for movement in unison therewith in the X direction, and operative to maintain said light source in registry with said lens mechanism.

* * * * *